US008894862B2

(12) United States Patent
Champ (10) Patent No.: US 8,894,862 B2
(45) Date of Patent: Nov. 25, 2014

(54) CONTROLLED IN-SITU BURNING OF OIL USING WICKING MATERIAL

(71) Applicant: Michael A. Champ, Falls Church, VA (US)

(72) Inventor: Michael A. Champ, Falls Church, VA (US)

(73) Assignee: Walden Ventures, LLC, Beverly Hills, CA (US)

( * ) Notice: Subject to any disclaimer, the term of this patent is extended or adjusted under 35 U.S.C. 154(b) by 0 days.

(21) Appl. No.: 13/760,720

(22) Filed: Feb. 6, 2013

(65) Prior Publication Data

US 2013/0202357 A1  Aug. 8, 2013

Related U.S. Application Data

(60) Provisional application No. 61/596,138, filed on Feb. 7, 2012.

(51) Int. Cl.
| | | |
|---|---|---|
| *B01D 15/00* | (2006.01) | |
| *E02B 15/08* | (2006.01) | |
| *E02B 15/04* | (2006.01) | |
| *E02B 15/06* | (2006.01) | |

(52) U.S. Cl.
CPC ........... *E02B 15/0821* (2013.01); *E02B 15/042* (2013.01); *E02B 15/06* (2013.01); *Y10S 210/924* (2013.01)
USPC ........... 210/663; 210/691; 210/693; 210/758; 210/150; 210/924

(58) Field of Classification Search
CPC ......... E02B 15/042; C02F 1/281; C02F 1/681
USPC .......... 210/922–924, 150, 663, 691, 693, 758
See application file for complete search history.

(56) References Cited

U.S. PATENT DOCUMENTS

| | | | | |
|---|---|---|---|---|
| 3,663,149 | A | * | 5/1972 | Heagler .......................... 431/2 |
| 3,677,982 | A | * | 7/1972 | Marx .............................. 521/55 |
| 3,696,051 | A | * | 10/1972 | McGuire ....................... 502/401 |
| 3,698,850 | A | * | 10/1972 | Sparlin ............................ 431/8 |
| 3,843,306 | A | * | 10/1974 | Whittington et al. ............. 431/8 |
| 4,154,684 | A | * | 5/1979 | Tokarz ...................... 210/242.1 |
| 4,507,017 | A | | 3/1985 | Magoon |
| 4,619,553 | A | | 10/1986 | Fischer |
| 5,466,379 | A | * | 11/1995 | Schiwek ....................... 210/680 |
| 5,538,027 | A | | 7/1996 | Adamson et al. |
| 6,852,234 | B2 | * | 2/2005 | Breitenbeck .................. 210/693 |
| 7,955,501 | B2 | | 6/2011 | Wilson |
| 8,376,145 | B2 | * | 2/2013 | Kormilitsyn et al. ......... 210/348 |
| 2003/0070995 | A1 | * | 4/2003 | Breitenbeck .................. 210/747 |
| 2010/0083946 | A1 | | 4/2010 | Cedar et al. |
| 2011/0280660 | A1 | | 11/2011 | Bahukudumbi et al. |

OTHER PUBLICATIONS

International Search Report and Written Opinion, International Application No. PCT/US2013/024912 (Apr. 15, 2013).

(Continued)

*Primary Examiner* — Chester Barry
(74) *Attorney, Agent, or Firm* — Thompson Hine L.L.P.

(57) ABSTRACT

In a water environment in conjunction with one or more types of oil, a method of in-situ burning including placing a fire resistant sorbent material in contact with the oil and allowing the oil to wick into the sorbent material. The method further includes burning the oil using the sorbent material as a wick.

29 Claims, 10 Drawing Sheets

(56) References Cited

OTHER PUBLICATIONS

Fingas, M.F. et al., The Newfoundland Offshore Burn Experiment—NOBE, Evolving Technologies, 1995 Oil Spill Conference, Washington, D.C., pp. 123-132.

Fingas, M.F. et al., The Newfoundland Offshore Burn Experiment—NOBE, Preliminary Results of Emissions Measurement, Environment Canada, Arctic and Marine Oil Spill Program (AMOP) Technical Seminar, 17th Proceedings, vol. 2, Jun. 8-10, 1994, Vancouver, British Columbia, Environment Canada, Ottawa, Ontario, pp. 1099-1164 (1994).

Allen, A.A., Contained Controlled Burning of Spilled Oil During the Exxon Valdez Oil Spill, Environment Canada, Arctic and Marine Oil Spill Program (AMOP) Technical Seminar, 13th, Jun. 6-8, 1990, Edmonton, Alberta, Canada, Environment Canada, Ottawa, Ontario, pp. 305-313 (1990).

Fingas, M.F. et al., The Newfoundland Offshore Burn Experiment—NOBE (1995).

S&T Committee, The Efficacy of Fire Resistant Containment Booms, A Response Tool for In Situ Burning of Oil (Feb. 1999).

NRT-RRT Factsheet, Science Technology Committee Fact Sheet—Apr. 1995, Temporary Storage Devices—Towable.

Fact Sheet: Risk Communication for Marine In Situ Burning: Addressing ISB at Public Meetings (Nov. 1998).

Nitrogen Inert Gas Extinguishing System, Westminster International Ltd., 4 pages (2008).

National Response Team, Science and Technology Committee, Questions and Answers for Communicating with the Public (Nov. 1998).

NRT Fact Sheet: In-Situ Burning of Oil, An Alternative Approach to Spill Response, prepared by the NRT Science & Technology Committee (Aug. 1992).

Bibliography on In-situ Burning, National Response Team, Science and Technology Committee (revised Apr. 1998).

NRT Fact Sheet, Igniters and Ignition Technology for In Situ Burning of Oil, prepared by the NRT Science & Technology Committee (Oct. 1995).

NRT Science and Technology Committee, Applicability of RCRA Hazardous Waste Management Regulations to the In Situ Burning of Oil Spills (Apr. 1996).

Guidance for Developing a Site Safety Plan for Marine In Situ Burn Operations, National Response Team, Science & Technology Committee (Oct. 1997).

NRT Science and Technology Committee, Fact Sheet: Residues from In Situ Burning of Oil on Water (Jan. 2000).

NRT Science and Technology Committee, Applicability of Clean Air Act Ambient Air Quality Regulations to the In Situ Burning of Oil Spills (Nov. 1995).

Hanzalik, J., Capt., Eighth Coast Guard District, Region VI, "Response Strategies" (2011).

NRT Fact Sheet, Aeration Techniques for In Situ Burning of Oil, Enhancing an alternative spill response method, prepared by the NRT Science & Technology Committee (Oct. 1995).

Nordvik, A.B. et al., Review of the Processes and Factors for Estimating Time Windows for In-situ Burning of Spilled Oil at Sea, Oil Spills First Principles: Prevention and Best Response, Elsevier Science Ltd., Burlington, pp. 573-603 (Jun. 2002).

Fingas, M.F. et al., The Newfoundland Offshore Burn Experiment—NOBE Experimental Design and Overview, AMOP Proceedings, pp. 1053-1063 (1994).

Fingas, M.F. et al., In-Situ Burn Studies—The Newfoundland Offshore Burn Experiment and Further Research, Proceedings of the Second International Oil Spill Research and Development Forum, IMO, London, pp. 465-471 (1995).

LaBelle, R.P. et al., 1993 Spill Off Tampa Bay, A Candidate for Burning?, Proceedings of 17th Artic and Marine Oil Spill Program (AMOP) Technical Seminar, vol. I, Jun. 8-10, 1994, Vancouver, British Columbia.

* cited by examiner

Wave Action

FIG. 3B

CONTROLLED IN-SITU BURNING OF OIL USING WICKING MATERIAL

This application claims priority to U.S. Provisional Patent Application Ser. No. 61/596,138, filed on Feb. 7, 2012, entitled IN-SITU BURNING OF AQUATIC OIL SPILL USING WICKING MATERIAL, the entire contents of which are hereby incorporated by reference.

The present invention relates generally to in-situ wicking, sorption and burning of oil following a discharge or spill in an aquatic environment.

BACKGROUND

Oil does not mix with water, though the two may form an emulsion. Efforts are made not to expose aquatic environments to oil, i.e., to prevent oil spills, leaks, loss of containment or the like.

When prevention or containment efforts fail and an oil is introduced in an aquatic environment, spill responders are tasked with cleaning up (remediating) the spill. There are mechanical and non-mechanical clean-up technologies. Mechanical clean-up technologies typically have the goal of collecting the oil, and include sorbents, booms, pumps, skimmers, and oil water separators. Non-mechanical technologies typically have the goal of breaking down and/or removing the oil, and include chemical response technologies (dispersants and emulsifiers), biological response technologies (biodegradation, biostimulants, and fertilizers); and in-situ burning (ISB). The selected mix of clean-up technologies will depend on potential shoreline and natural resource impacts, the size, location, and type of the spill, weather, and other variables.

Among the mechanical technologies noted above, booms are floating mechanical barriers used to contain and control the movement of substances that float, e.g., oil. Booms are typically made up of four or five major components. A "membrane" forms the barrier. "Flotation" is attached to the upper edge of the membrane to give it buoyancy. "Ballast" is attached to its lower edge to give it stability. One or more "tension members," or the basic membrane, give the assembly the required strength. Booms are manufactured in various length segments which are joined together during deployment, such segments being equipped with a suitable connecting mechanism at each end.

Among the non-mechanical technologies noted above, in-situ burning describes the remediation technique of burning the oil, typically near where it was spilled, as it floats on the surface of the water. Unchecked, a layer of oil on water rapidly spreads, reducing the layer thickness until it is too thin to sustain combustion. To thicken the oil layer, typically a boom is used to collect the oil into an area bounded by the boom. In-situ burning typically requires a specialized, e.g., fire-resistant, boom because the fire can spread to the oil adjacent the boom. The oil layer contained by the fire-resistant boom is ignited with the goal of consuming all of the burned oil via combustion, i.e., burning away all of the oil. Such a fire is regarded as an uncontrolled burn, i.e., a fire over which little to no control (e.g., selectively extinguishing the fire) can be exerted.

Also among the mechanical technologies noted above, fiberglass wool and mineral wool have been suggested as sorbents for an aquatic oil spill. Once substantially saturated, the wool is physically retrieved from the body of water, taking with it the sorbed oil, thereby removing the oil from the water.

SUMMARY

In one embodiment, the present invention is utilized in a water environment in conjunction with one or more types of oil, and takes the form of a method of in-situ burning including placing a fire resistant sorbent material in contact with the oil and allowing the oil to wick into the sorbent material. The method further includes burning the oil using the sorbent material as a wick.

In another embodiment, the present invention is for use in an aquatic environment in which there is one or more types of oil, and is an in-situ burning device including a fire resistant sorbent material configured in different configurations, shapes, thickness, orientation and sizes to wick the oil for a flame.

BRIEF DESCRIPTION OF THE DRAWINGS

Certain embodiments of the present invention are described below with reference to the attached drawings, in which.

DETAILED DESCRIPTION

Aspects of the present invention are generally directed towards in-situ burning of oil in a context of an oil spill in an aquatic or water environment. The invention can be used in fresh water, salt water environments (including open ocean environments and other salt water environments), brackish water, all of which are included in the terms "water environment" and "aquatic environment" as used herein. The invention can use a sorbent batt made of various materials, including but not limited to rockwool, mineral wool, stone wool including basalt fibers, ceramic fibers, nano fibers, etc. which can have an oleophilic coating, an oligophilic coating and/or a hydrophobic coating, e.g., as a structure for wicking oil for a flame.

Figure 1A:
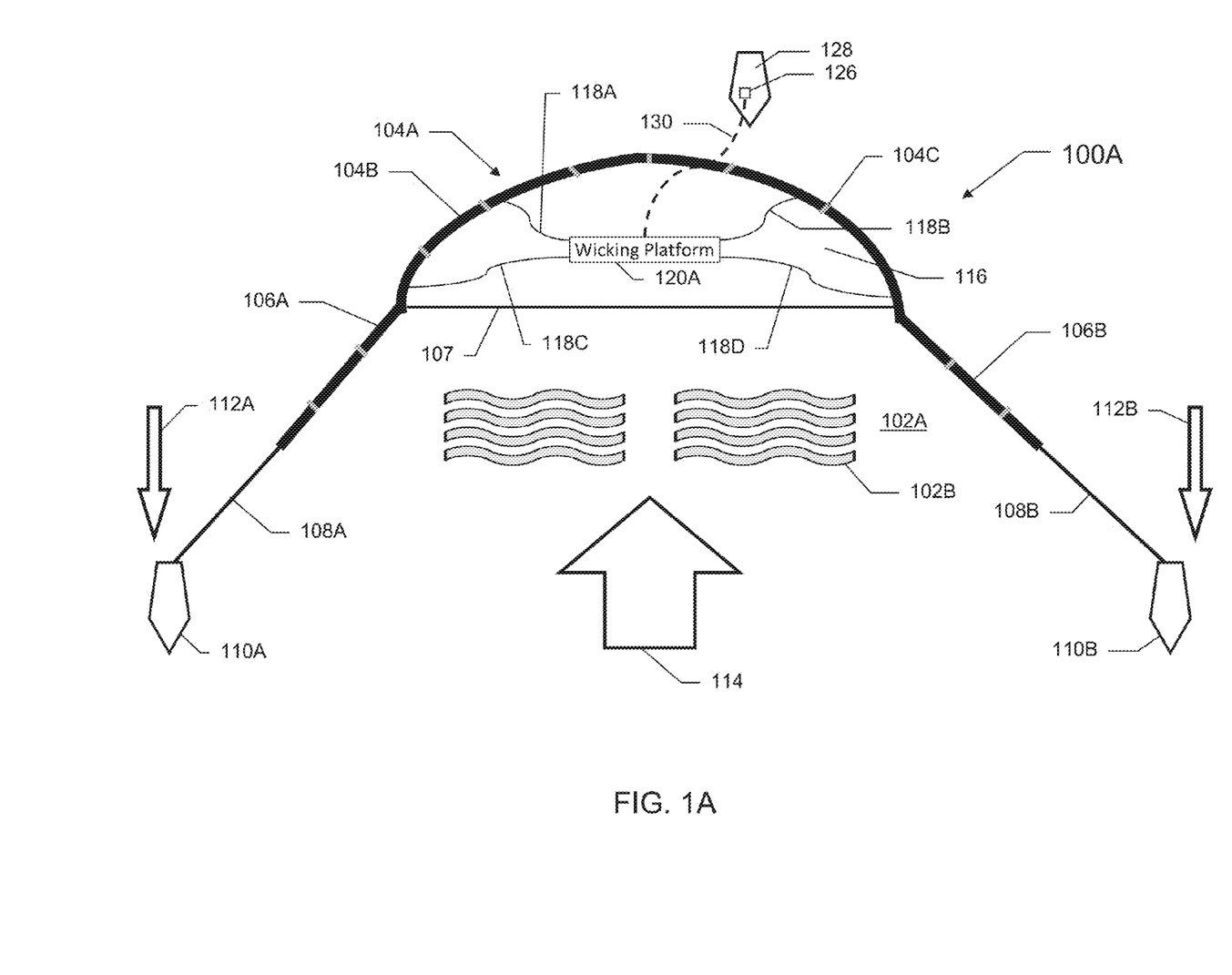
FIG. 1A is a top view of an in-situ oil-burning system for oil spill response for removing oil off water, according to an embodiment of the present invention.

FIG. 1A is a top view of an in-situ oil-burning system 100A as an oil spill response cleanup technology for cleaning aquatic oil spills, according to an embodiment of the present invention. In FIG. 1A, system 100A is located in an aquatic environment, where oil 102A is lying or floating in a layer on a surface 102B of a body of water, which typically will undulate with water waves. An oil can be considered to be any substance that is liquid at ambient surface temperatures and does not mix (yet can form an emulsion) with water, but may mix with other oils and organic solvents. As used herein, the term "oil" includes vegetable oils, volatile essential oils, petrochemical oils, and synthetic oils. An aquatic environment includes freshwater and marine (saltwater) bodies of water, typically of a size that can be described as satisfying open-water criteria. Oil can be obtained in and/or transported through aquatic environments, with mishaps in the former representing some of the ways that the latter can be imperiled.

System 100A includes a boom 104A, e.g., a fire-resistant boom, connected to towing vessels 110A and 110B via connectors, e.g., steel cables, 108A and 108B. In this example, boom 104A is arranged as a series of segments 104B releasably connected together via linking mechanisms 104C. While cables 108A and 108B can be connected directly to ends of boom 104A, in this example, booms 106A and 106B are interposed between cables 108A and 108B and the ends of boom 104A, where booms 106A and 106B can also be fire-resistant booms. Waves 102B are moving in a direction 114 whereas towing vessels 110A and 110B are moving in directions 112A and 112B that are substantially opposite to wave direction 114, thereby capturing oil 102A in a pocket 116, where pocket 116 has a shape of a catenary formed by boom 104A. Also illustrated in FIG. 1A is an optional tether line or cross bridle 107, connected at its ends to the boom 104A, which helps boom 104A adopt and remain in the catenary shape.

Located in pocket 116, e.g., centrally therein, is a wicking platform 120A (described in more detail below). The fire of the in-situ burning (see fire 242 described below) occurs at or above platform 120A. The location of platform 120A within pocket 116 can be maintained, e.g., via connectors (e.g., steel cables, e.g., submerged) 118A-118D that connect platform 120A at its corners or the like to boom 104A. System 100A also includes an optional supercharger 126 (e.g., a source of pressurized air such as an air pump) for not only aerating, but supercharging, wicking platform 120A, as will be described in more detail below. Air source 120A can be located on a floating structure 128, e.g., a tender (a type of vessel), and the pressurized air can be delivered to wicking platform 120A via a pipe 130, e.g., a flexible tube, that can be submerged to extend underneath boom 104A and oil 102A collected in pocket 116.

Figure 1B:
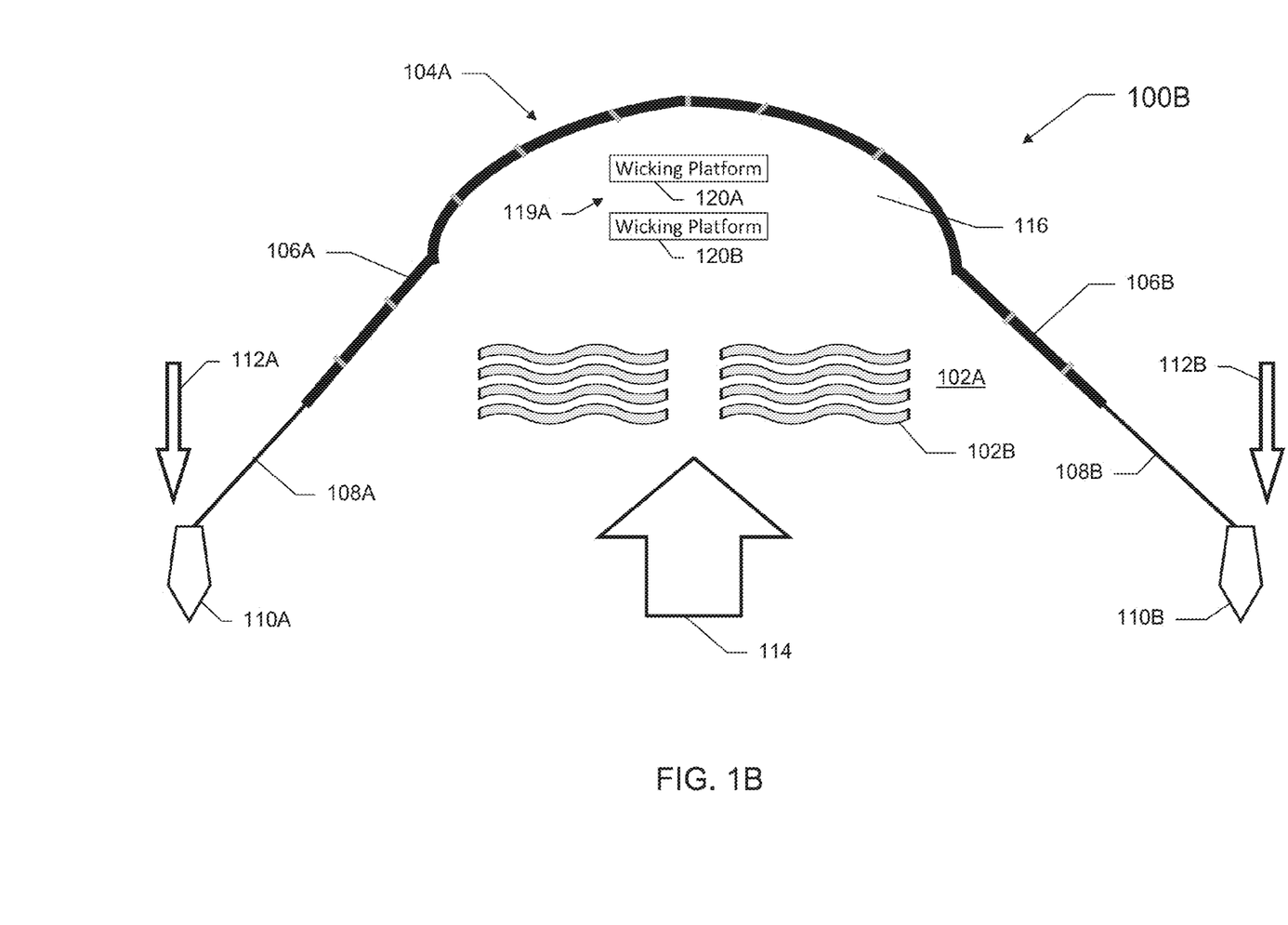
FIG. 1B is a top view of an in-situ oil-burning system for cleaning an aquatic oil spill, according to another embodiment of the present invention.

FIG. 1B is a top view of an in-situ oil-burning system 100B for oil spill cleanup, according to another embodiment of the present invention. FIG. 1B is similar to FIG. 1A albeit simplified for the sake of illustration. System 100B can include all of the elements of system 100A. However, in contrast to system 100A, system 100B of FIG. 1B includes two wicking platforms 120A and 120B arranged in a 2×1 grid 119A. Alternately, system 100B can include three or more wicking platforms, 120A, 120B, . . . , 120N, where N is a positive integer and 3≤N.

Figure 1C:
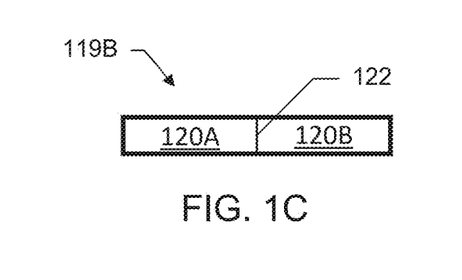
FIGS. 1C-1E are top views of wicking platform grids, respectively, according to other embodiments of the present invention.
Figure 1D:
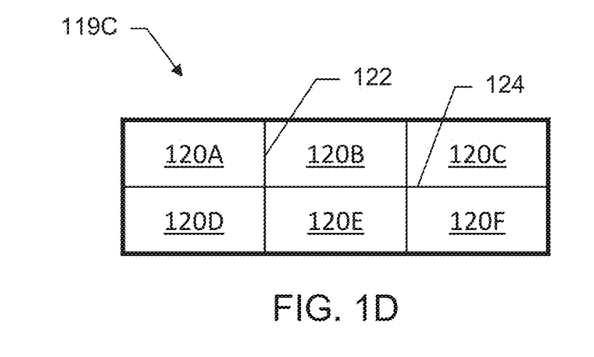
Figure 1E:
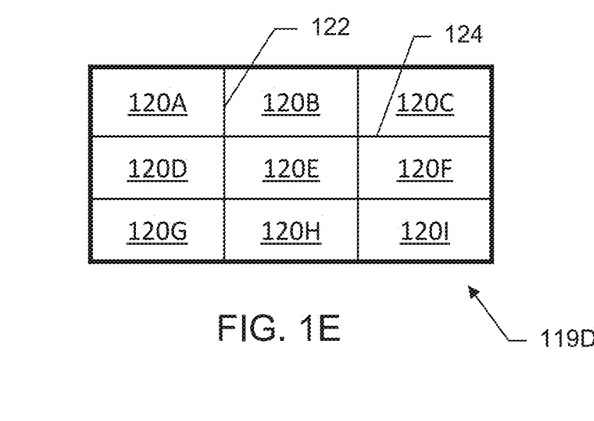

FIGS. 1C-1E are top views of wicking platform grids 119B-119D, respectively, according to other embodiments of the present invention. In FIG. 1C, grid 119B includes wicking platforms 120A and 120B arranged in a 2×1 grid. Platforms 120A and 120B are coupled via a connector 122. In FIG. 1D, grid 119C includes wicking platforms 120A-120F, coupled via connectors 122 and connectors 124, and is arranged in a 2×3 grid. In FIG. 1E, grid 119D includes wicking platforms 120A-120I, coupled via connectors 122 and connectors 124, and is arranged in a 2×3 grid. Connectors 122 and connectors 124 can be of resilient construction in order to better tolerate wave undulations, etc., of an aquatic environment.

Figure 1F:
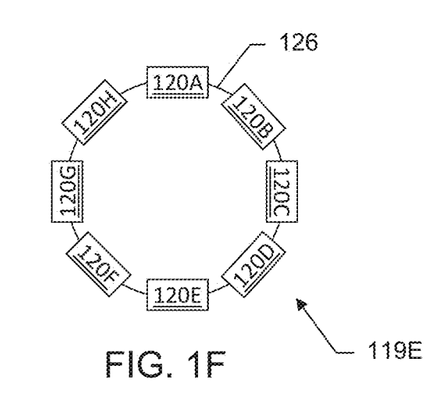
FIG. 1F is a top view of wicking platform arrangement 119E, according to another embodiment of the present invention.

FIG. 1F is a top view of wicking platform arrangement 119E, according to another embodiment of the present invention. In FIG. 1F, arrangement 119E includes wicking platforms 120A-120H, coupled via connectors 126, in a ring or closed loop arrangement having a shape resembling an ellipse or a circle. If, for example, the ring arrangement included only three wicking platforms 120A-120C, then the shape would be triangular. Connectors 126 can be similar to connectors 122 described above.

In the embodiment of FIGS. 1A and 1B, "off the shelf" commercial, i.e., standard commercial, open water and fire-resistant boom segments that can withstand high temperatures can be used as boom segments 104B. Basic components of a boom have been described above. Appropriate selection of the characteristics of the components of boom segments 104B (as is within the ordinary level of skill in the art) renders pocket 116 of a size, depth and length sufficient to handle the volume of oil that is being released from a vessel or platform, or which is desired to be captured, and which is being transported downstream therefrom and at some point reaches the surface of the body of water. Boom 104A can be held on station (in place) downstream of the spill by work boats 110A, 110B (which, e.g., can move system 104A/104B if needed should the physical condition, winds and/or currents change) or can be anchored by buoys (not illustrated) should environmental and natural geology conditions and flow patterns allow such. Similarly, "off the shelf" commercial, i.e., standard commercial, open water and non-fire-resistant boom segments can be used to form booms 106A and 106B that direct oil flow towards wicking platform 120A, 120B, etc., and into pocket 116 of fire boom 104A. Wicking platform 120A, 120B, etc., can float on the ocean surface and be considered a controlled fire structure.

General advantages of systems 100A, 100B include one or more of the following: they can be located close to the spill (e.g., downstream from the spill); and they can be located in a manner that oil 102A can be collected and burned by wicking platforms 120A, 120B, etc., as a "controlled" in-situ oil spill burn. The systems 100A, 100B can be placed and anchored downstream of a spill in nearly any configuration and length with, in one case, numerous multiple wicking platforms 120A, 120B, each separated by a length of fire boom 104A, in such a manner that the systems 100A, 100B form a line to wick and burn spilled oil to prevent oil from coming ashore. The systems 100A, 100B can thus protect sensitive shoreline environments including but not limited to islands, offshore barrier islands, embayments, estuaries, rivers or tourist beaches.

Advantages of systems 100A, 100B over conventional oil spill response and cleanup technologies include one or more of the following: (1) on site control and clean up; (2) greater efficiency, with a significantly higher oil cleanup removal rate (volume/time); (3) significantly more cost effective; (4) significantly less damaging to environment (birds, mammals, fish, etc.); (5) significantly less oil coming ashore (less oiled beaches, marshes, etc.); (6) significantly less exposure to toxicity (less air pollution, and public health and cleanup worker risk); and (7) significantly less generation of waste to be put in landfills.

Figure 2A:
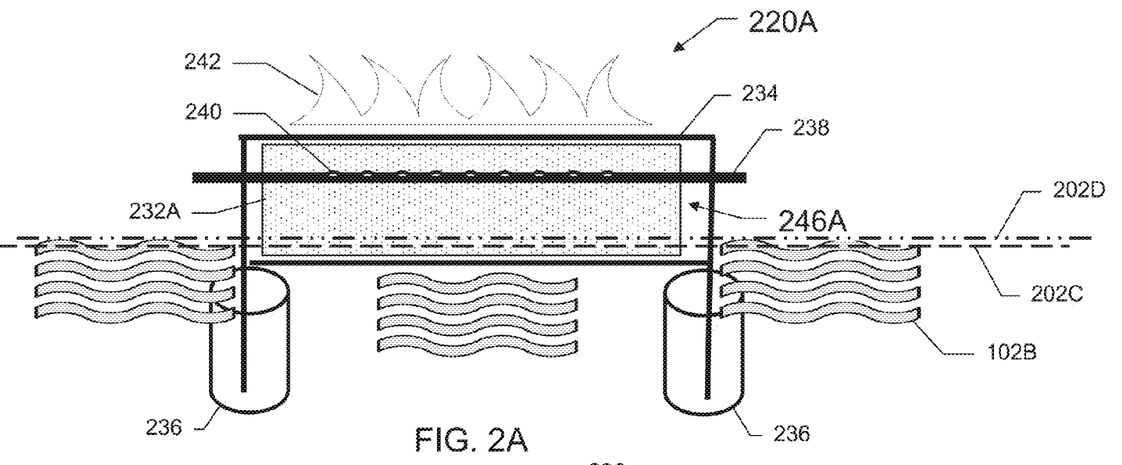
FIG. 2A is a side view of an in-situ oil-burning, wicking platform for cleaning an aquatic oil spill, according to an embodiment of the present invention.
Figure 2B:
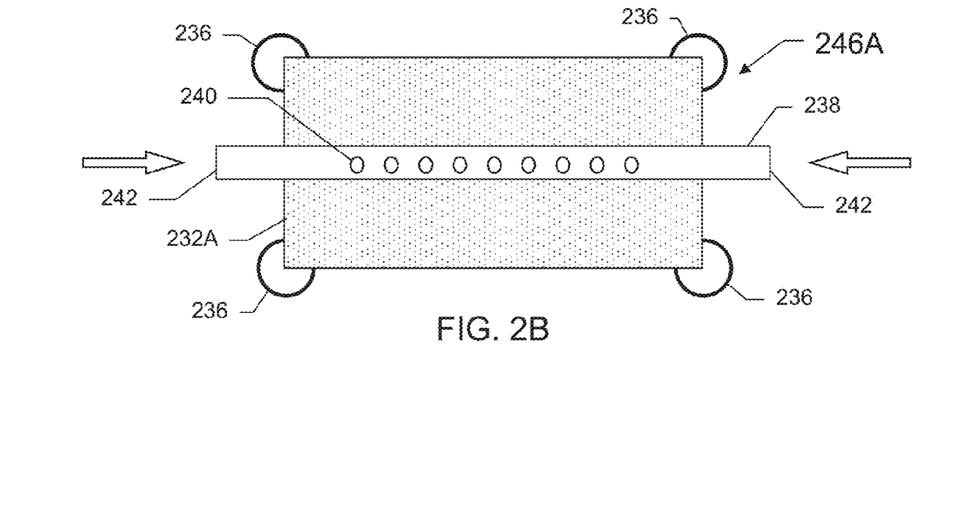
FIG. 2B is a sectional view of the aerated wick of FIG. 2A that is orthogonal relative to the perspective of FIG. 2A.

As indicated in FIGS. 2A-2L (described in detail below), each of wicking platforms 120A, 120B, etc., can include at least one batt 232A, the overall shape of which in side view can be square, rectangular, polygonal, ellipsoidal, circular or trapezoidal, depending on which shape is desired (e.g., in terms of wicking rate, ignitability, etc.) given environmental conditions and spill requirements and conditions. One or more embodiments of wicking platform 120A, 120B, etc., can be modular so as to be adjustable in wicking and burning capacities according to the magnitude of the spill and the associated environmental conditions (including a wide range of low to high energy environments). FIGS. 2A and 2B (again, described in more detail below) illustrate a modular, rectangular wicking platform 220A, e.g., for cleaning oil spills in low energy environments. Also as described in more detail below, batt 232A can be formed of a sorbent, flame/fire/combustion resistant material, including but not limited to rockwool, mineral wool (e.g., stone wool), ceramic fibers, nano fibers, etc. Mineral wool is a broad term including rock or stone wool (which can be made by melting predominantly igneous rock and other inorganic materials) and slag wool (made primarily from iron ore blast furnace slag), whose production is similar to that of fiberglass wool. The batt 232A material can be high temperature resistant; e.g. in one case resist burning and/or melting when exposed to a temperature of, in one case, 700° F. for one minute, and in another case 1000° F. for one minute. The batt 232A material can be covered by (packaged in) a ligature (e.g., a high temperature resistant metal mesh or fishnet) thereby forming a bale, and sized/shaped to fit in a floating frame (e.g., a metal scaffolding structure) which can partially submerge the same to a depth appropriate to the thickness the layer of oil 102A.

The highly efficient wicking of the stone wool or other sorbent material is such that the spilled oil is wicked (in one case, at least in part by adsorption, but could also be by other means) into the batt 232A, raising the oil above a surface 202C of the body of water, where the oil can volatilize to an extent that that the released vapors can be ignited and burned in a region in, around or above batt 232A according to a process similar to that of an oil lamp or a candle, with the heat of burning being concentrated in the region above batt 232A. Also, batt 232A can be fitted with a perforated metal tube (e.g., with ventilation nipples) and (optionally) ends that can be fitted with funnel mouths of an appropriate size. Air heated by the fire 242 rises upwards away from bale 232A, causing cooler air to be drawn into ends of the tube where it exits through the perforations into batt 232A and then is pulled into the flame, thereby increasing the efficiency of combustion in general, and particularly in interior (relative to peripheral) regions above batt 232A, significantly increasing the efficiency of burning and thus reducing the production of black smoke.

FIG. 2A is a side view of an in-situ oil-burning, wicking platform 220A for cleaning an aquatic oil spill, according to an embodiment of the present invention. In FIG. 2A, wicking platform 220A includes at least one sorbent batt 232A configured to wick oil from a layer 202D thereof laying or floating on a surface 202C of a body of water. Batt 232A can be fibrous, i.e., includes fibers. To reduce health risks, it may be advantageous if substantially all (if not all) of the fibers of the batt 232A are of sufficient size to be respirable. Mineral wool is fibrous, with the fibers being arrangeable into batts. The arrangement into batts can include application of coatings, sizings, binders, oils, etc. to the sorbent material/fibers. Material sources for stone wool can include igneous rock (e.g., basalt) and chalk. During manufacture, the source materials are melted. The molten material is spun into threads or fibers in a spinning chamber, in a process analogous to the formation of cotton candy. The fibers are collected and then compressed into batts, which can be cut into desired shapes and sizes. For example, batt 232A can be a stone wool that includes basalt fibers, e.g., where at least the majority of fibers are basalt fibers. Optionally, batt 232A can be coated with at least one of an oleophilic material, an oligophilic material or a hydrophobic material to increase wicking capability.

Oil is wicked or sorbed, such as by absorption and/or adsorption (e.g., via capillary action) into batt 232A. Depending upon conditions of the oil spill, there may be a significant or substantial oil-water emulsion. The wicking, in effect, can demulsify the emulsion. Once batt 232A is at least significantly (if not substantially) saturated with oil, the oil can be ignited, e.g., via a heli-torch, a burning flare that is shot into batt 232A, etc., thereby producing fire 242.

Wicking platform 220A further includes a frame 234 to which batt 232A can be mounted. Also, frame 234 can be mounted to buoyancy units 236. Buoyancy units 236 can be active buoyancy units that include ballast tanks (not illustrated) which can be selectively purged of or filled with air to selectively raise or lower batt 232A relative to surface 202C of the water body, e.g., above, and in contact with, the surface of oil layer 202D. For example, a part of batt 232A can extend down through oil layer 202D and through surface 202C into the water body, thereby facilitating adsorption (e.g., by capillary action) of oil by batt 232A.

Such selective buoyancy control can be used in a fire suppression or control mode of operation. For example, the position of batt 232A can be controlled to submerge batt 232A to suffocate (i.e., starve of oxygen), and thereby extinguish, the fire, as illustrated in FIG. 2J. Alternately, for example, the position of batt 232A can be controlled to elevate batt 232A above, and thus out of contact with, oil layer 202D, which cuts off the supply of fuel to the fire 242, thereby extinguishing the fire 242 once the adsorbed oil has been burned away, as illustrated in FIG. 2K. The batt 232A and/or frame 234 may also be able to be raised out of contact with the water surface to raise the batt 232 to a safe height during inclement weather and/or high waves.

The batt 232A and/or frame 234 may also be mounted at an incline. For example, in the embodiment of FIG. 2A, the right (illustrated) side of the frame 234 may be positioned lower than the left (illustrated) side to incline the frame 234 and batt 232A. This configuration may be advantageous in that waves traveling up the incline may carry and deposit some of the oil layer 202D on the top surface of the batt 232A, spreading out the oil and moving it away from the water surface 202C to increase combustion or combustion efficiency thereof. In one case the batt 232A and/or frame 234 is mounted such that part of the lower surface of the batt 232A and/or frame 234 is positioned below the water line 202C (in one case, between about 3 and about 6 inches below the water line 202C, or to such other depth as is necessary to reach the bottom of any floating oil or oil emulsion) while another part of the lower surface of the batt 232A and/or frame 234 is positioned above the water line 202C.

The frame 234 may be able to be mounted at an incline in various manner. In one case, for example, the buoyancy units 236 or portions coupled thereto may have a plurality of vertically spaced grooves or nipples, and the frame 234 can be slidably mounted between the grooves or nipples in a manner analogous to how an oven rack is mounted in an oven. In this case portions of the frame 234 may be mounted to the grooves or nipples at differing heights on differing ones of the buoyancy units 236 to mount the frame 234 at an angle. Alternately, differing ones of the buoyancy units 236 can be moved vertically, such as by adjusting their buoyancy, to position the frame 234 at an incline. In one case the angle of the frame 234 can be adjusted in the desired manner by remote control to control the burn properties of the system.

As a further alternative, selective buoyancy can be used to flip batt 232A over. For example, in the event that the wicking action of batt 232A should become clogged, selectively inducing negative buoyancy on one side of wicking platform 120A and positive buoyancy on the opposite side can have a capsizing effect, thereby flipping batt 232A over.

As yet a further alternative, such selective buoyancy can be used to position wicking platform 120A within the area contained by boom 104A. Platform 120A can be completely submerged outside the area contained by boom 104A, moved underneath surface 202C of the water body so that it passes beneath boom 104A until being located centrally within the area contained by boom 104A, and then caused to breach surface 202C of the water body.

Figure 2C:
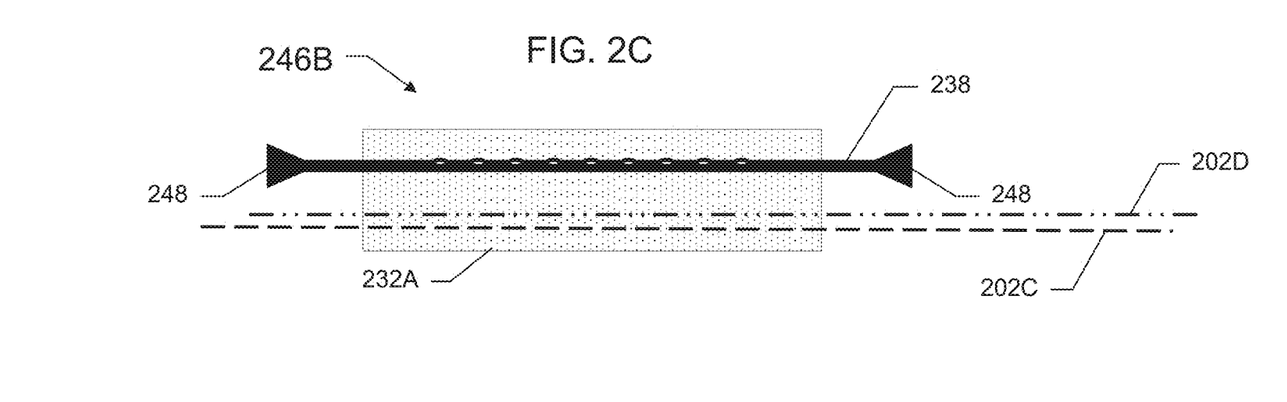
FIGS. 2C and 2D are side views of aerated wicks, respectively, according to other embodiments of the present invention.
Figure 2D:
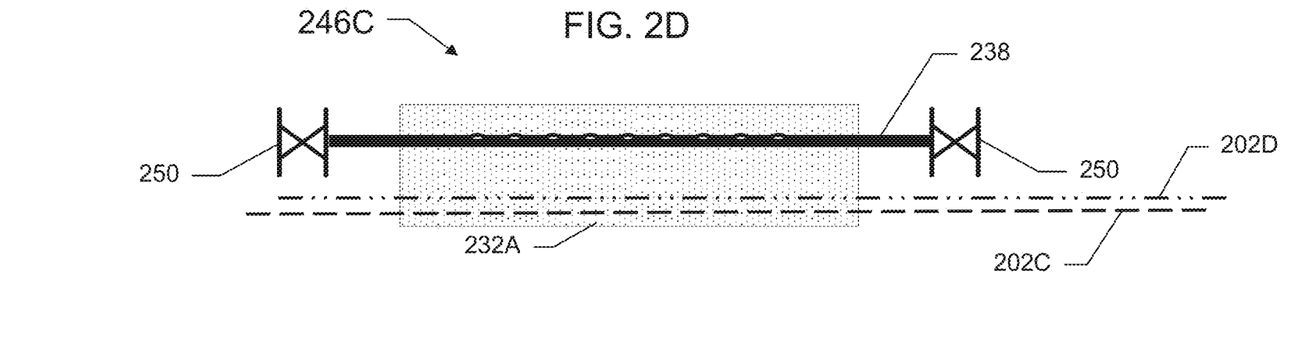
Figure 2E:
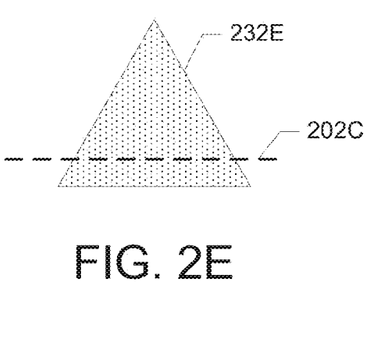
FIGS. 2E-2I are cross-sectional views of alternate configurations of the batt of FIG. 2A, respectively, according to other embodiments of the present invention.
Figures 2F, 2G:
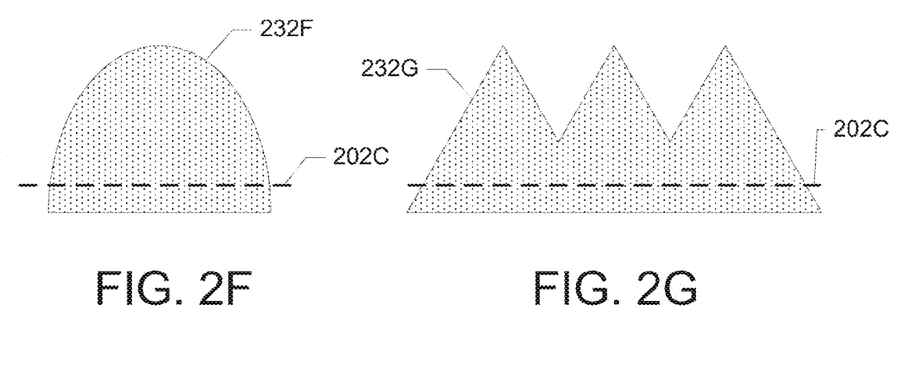
Figure 2H:
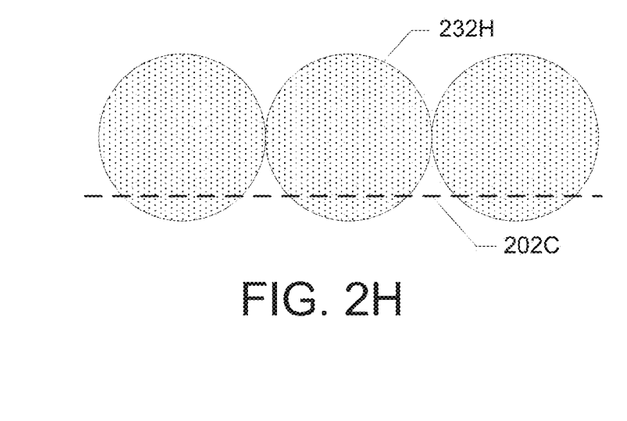
Figure 2I:
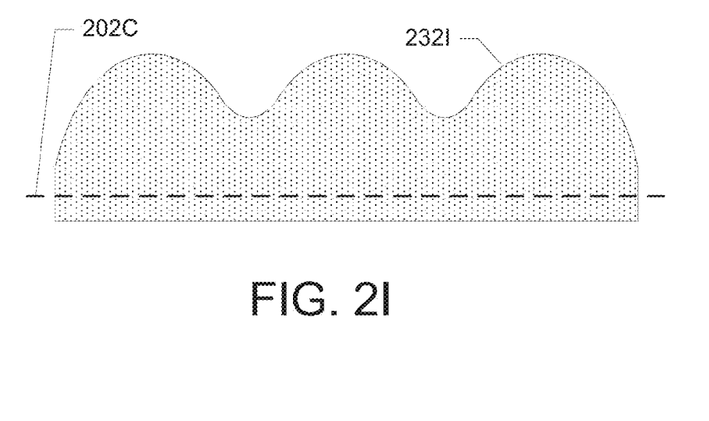
Figure 2J:
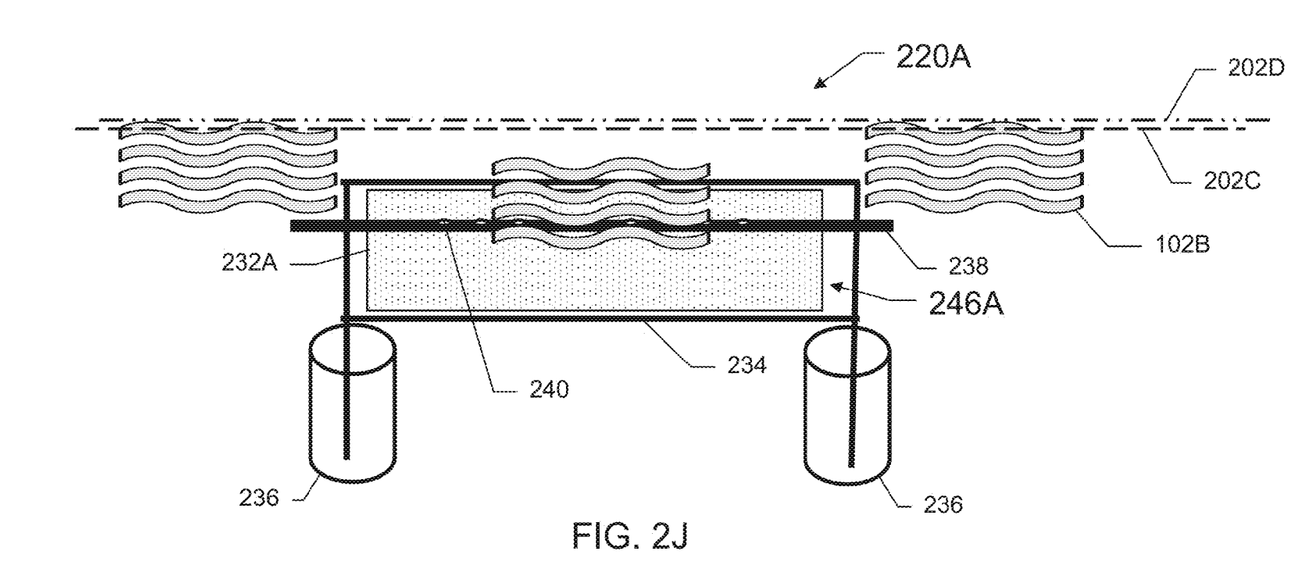
FIG. 2J is a side view of the in-situ oil-burning, wicking platform of FIG. 2A in a submerged, fire-suppression mode of operation, according to another embodiment of the present invention.
Figure 2K:
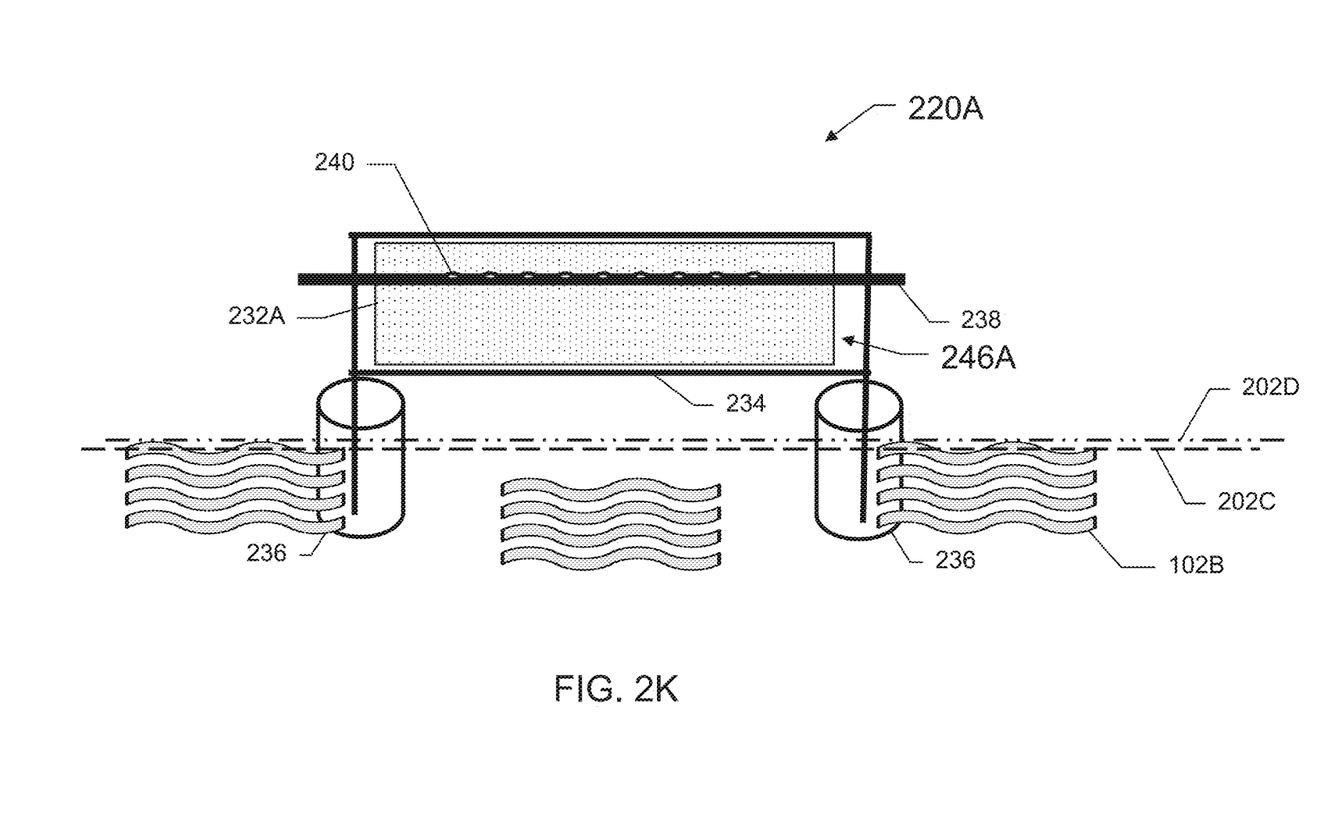
FIG. 2K is a side view of the in-situ oil-burning, wicking platform of FIG. 2A in an elevated, fire-suppression mode of operation, according to another embodiment of the present invention.
Figure 2L:
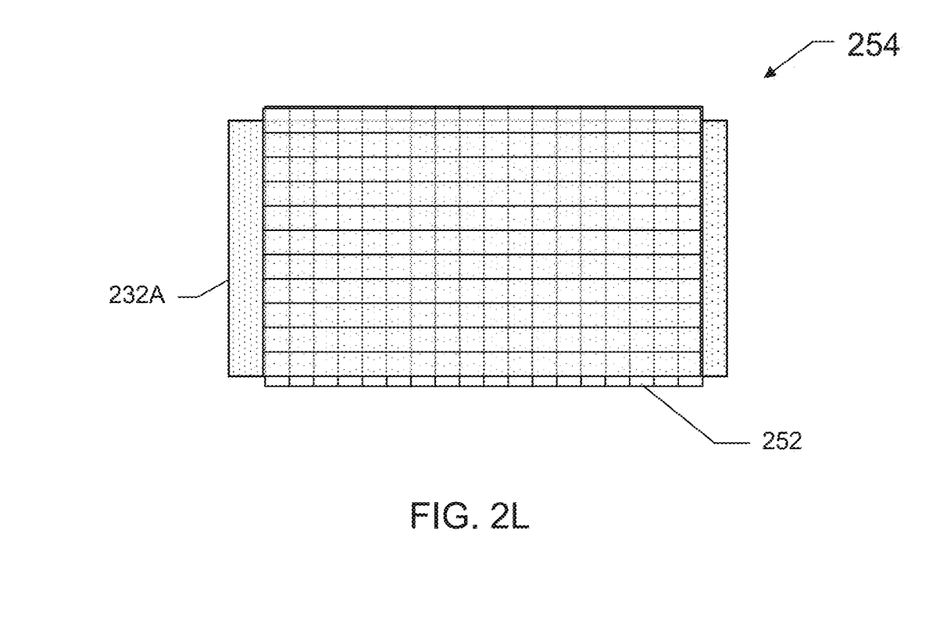
FIG. 2L is a side view of an oil-wicking bale according to another embodiment of the present invention.

FIG. 2L is a side view of an oil-wicking bale 254 according to another embodiment of the present invention. In FIG. 2L, batt 232A is illustrated as being bound with a fire resistant ligature 252 to form an oil-wicking bale 254. Ligature 252 can be, e.g., wire mesh, e.g., formed from metal that can maintain its strength and its structural integrity when subjected to the heat load produced by fire 242. Also, optionally, e.g., the wire mesh material can be resistant to the corrosive effects of salt water. Advantages of ligature 254 include that it can help batt 232A retain a desired shape, and that it can facilitate connecting multiple batts 232A together in a modular grid assembly. Ligature 254 can encircle a long dimension, or other dimensions, of batt 232A with ends of batt 232A uncovered by ligature 254. Alternately, ligature 254 can completely enclose batt 232A. In some cases, it may be desired to ensure that the ligature 254 is not too tight, which could inhibit the wicking process.

Further alternately, ligature 254 can be supplemented or replaced by a planar panel (not illustrated), e.g., of the same wire mesh, upon which bale 232A can be mounted. The ligature 254 can also or instead take the form of fishnet casing or packaging. The ligature 254 thus may enable full recovery of the batt 232A from the aquatic environment.

Returning again to FIG. 2A, batt 232A can be used in conjunction with an aeration system to facilitate combustion. For example, a pipe 238 having plurality of axially-spaced vents 240 can be inserted into batt 232A. Vents 240 can be, e.g., holes in pipe 238. One or both ends of pipe 238 can be left open to allow air to travel through pipe 238 and exit through vents 240 thereby aerating batt 232A. In FIG. 2A, much like a chimney draws air into a fireplace, fire 242 can draw air into the uncapped ends of pipe 238. Together, batt 232A and pipe 238 can be described as comprising an aerated wick 246A. FIG. 2B is a sectional view of aerated wick 246 taken from a perspective oriented orthogonally relative to the perspective of FIG. 2A.

Another fire suppression mode of operation that can be used with or in place of the buoyancy-based modes described above is to selectively pump a fire suppression material through tube 238 (via pipe 130) into batt 232A. An example of the fire suppression material is nitrogen gas. An advantage of nitrogen gas over foam-based fire-suppression material is that tube 238 and batt 232A can be substantially cleared of nitrogen gas quickly, thereby facilitating a quick restart of fire 242.

FIGS. 2C and 2D are side views of aerated wicks 246B and 246C, respectively, according to other embodiments of the present invention. Aerated wicks 246B and 246C are alternative versions of aerated wick 246A. In FIG. 2C, pipe 238 has been fitted with fluted ends 248 to promote the influx of air thereinto. In FIG. 2D, pipe 238 has been fitted with pipe couplers 250 for coupling to pipe 130 and thereby to a device 126 for supplying air and/or pressurized air, which can be termed a supercharger. Alternately, coupler 250 can be used to connect one end of pipe 238 to another end of another instance of pipe 238 in another instance of aerated wick 246C, i.e., to pneumatically connect two aerated wicks 246C together.

Aeration of the batt 232A may provide several advantages, including increasing the efficiency of burning of the oil. In particular, aeration can increase the temperature of the heating process, which can in turn increase the combustion of PAHs (Poly aromatic hydrocarbons), providing less black smoke which can be toxic. Higher burn temperatures provided by the aeration also creates more volatile light end organics that wick and burn better from the spilled oil, removing more oil and providing higher burning rates and efficiency.

FIGS. 2E-2I are cross-sectional views of alternate configurations of batt 232A, respectively, according to other embodiments of the present invention. In FIGS. 2E-2I, each configuration of batt 232A has at least two sides including: a first side configured to be adjacent or submerged below surface 202C of the water body, and a second side opposite the first side. In FIG. 2E, the second side of batt 232E is triangular in shape. In FIG. 2F, the second side of batt 232F is semicircular in shape. In FIG. 2G, the second side of batt 232G is saw-toothed in shape. In FIG. 2H, the second side of batt 232A is rectified-sinusoidal in shape. In FIG. 2I, the second side of batt 232A is sinusoidal in shape.

Figure 3A:
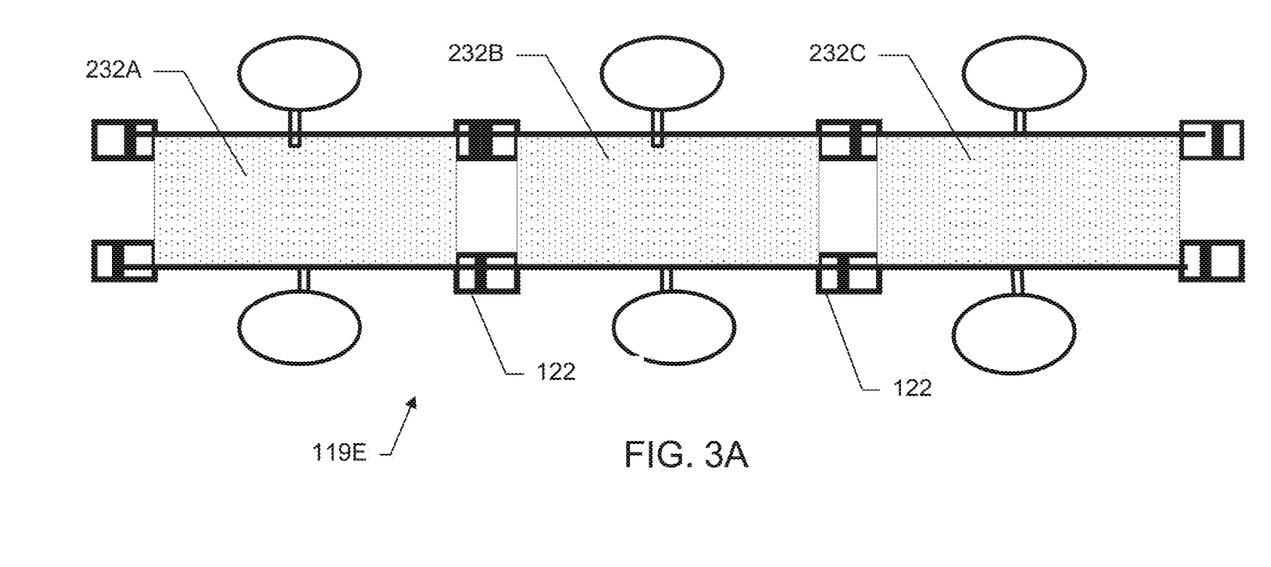
FIGS. 3A and 3B are top views of a wicking platform grid according to another embodiment of the present invention.
Figure 3B:
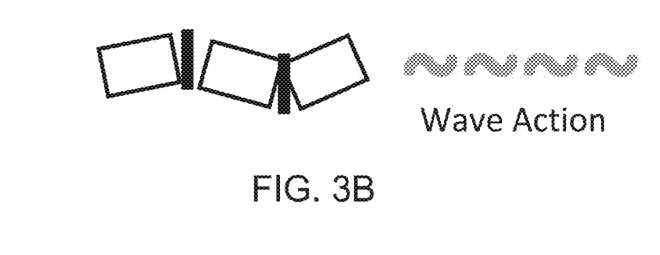

FIGS. 3A and 3B are top views of a wicking platform grid 319E according to another embodiment of the present invention. In FIGS. 3A and 3B, grid 119E includes wicking platforms 120A-120C (including associated bats 232A, 232B and 232C) arranged in a 3×1 grid. Platforms 120A-120B are coupled via articulated connectors 122, which is a type of resilient construction that can tolerate wave undulations, etc., of an aquatic environment.

The terms "invention," "the invention," "this invention" and "the present invention" used herein are intended to refer broadly to all of the subject matter of this document and the associated claims. Statements containing these terms should not be understood to limit the subject matter described herein or to limit the meaning or scope of the claims. Furthermore, this document does not seek to describe or limit the subject matter covered by the claims in any particular part, paragraph, statement or drawing herein. The subject matter should be understood by reference to the entire specification, all drawings and each claim.

While various embodiments of the present invention have been described herein, it should be understood that they have been presented by way of example only, and not limitation. Different arrangements of the components depicted in the drawings or described above, as well as components and steps not shown or described are possible. Similarly, some features and subcombinations are useful and may be employed without reference to other features and subcombinations. It will be apparent to persons skilled in the relevant art that various changes in form and detail can be made therein without departing from the spirit and scope of the invention. Accordingly, the present invention is not limited to the embodiments described above or depicted in the drawings, and various embodiments and modifications can be made without departing from the scope of the claims below.

What is claimed is:

1. In a water environment in conjunction with one or more types of oil, wherein at least part of the oil is mixed with water to form an emulsion, a method of in-situ burning comprising:
   placing a fire-resistant sorbent material in contact with the oil or emulsion;
   allowing the oil to wick into the sorbent material and demulsifying the emulsion by the sorbent material to separate the oil from the water;
   burning the oil using the sorbent material as a wick, wherein the sorbent material is not burnable and is not burned during the burning of the oil; and
   actively aerating the sorbent material with pressurized fluid to facilitate burning of the oil.

2. The method of claim 1, wherein the oil is floating on top of the water, and wherein the allowing step separates the oil from the water.

3. The method of claim 1, wherein the aerating includes:
   providing at least one pipe, the at least one pipe including a vented segment having a plurality of vents therein;
   disposing each vented segment in a batt of the sorbent material; and
   allowing air to travel through the at least one pipe and exit the vents thereby aerating the batt to increase burning efficiency.

4. The method of claim 3, wherein the burning draws the air into the at least one pipe.

5. The method of claim 3, wherein the aerating includes pumping air into the at least one pipe.

6. The method of claim 3, further comprising forcing a fire-suppression material through the at least one pipe and into the batt via the vents to extinguish the burning.

7. The method of claim 1, wherein the placing step includes positioning at least part of the sorbent material above, and at least part of the sorbent material in contact with, the oil on the surface of the water or the oil/water emulsion.

8. In a water environment in conjunction with one or more types of oil, wherein the oil is floating on a surface of the water, a method of in-situ burning comprising:
   placing a fire-resistant sorbent material in contact with the oil;
   allowing the oil to wick into the sorbent material; and
   burning the oil using the sorbent material as a wick, wherein the sorbent material is not burnable and is not burned during the burning of the oil, and wherein the placing step includes positioning at least part of the sorbent material above, and at least part of the sorbent material in contact with, the oil on the surface of the water, and wherein the oil is a layer floating on the surface of the water, and the placing step includes submerging a part of the sorbent material to a depth comparable to a thickness of the oil layer.

9. The method of claim 1, wherein the sorbent material is not consumed during the burning, and wherein the oil wicks into the sorbent material by at least one of absorption or adsorption.

10. In a water environment in conjunction with one or more types of oil, wherein at least part of the oil is mixed with water to form an emulsion, a method of in-situ burning comprising:
    placing a fire-resistant sorbent material in contact with the oil or emulsion;
    allowing the oil to wick into the sorbent material and demulsifying the emulsion by the sorbent material to separate the oil from the water; and
    burning the oil using the sorbent material as a wick, wherein the sorbent material is not burnable and is not burned during the burning of the oil, further comprising extinguishing the burning by submerging a portion of the sorbent material or by raising the sorbent material out of the water to break contact between the sorbent material and the oil.

11. The method of claim 1, further comprising confining the oil using a boom assembly, and wherein the placing step includes locating the sorbent material amidst the confined oil.

12. The method of claim 11, wherein the confining includes:
    providing boom segments;
    connecting the boom segments to form the boom assembly; and
    connecting ends of the boom assembly to enclose the oil, and wherein the locating step includes connecting the sorbent material to the boom assembly to position the sorbent material.

13. The method of claim 8, wherein the sorbent material is at least one of mineral wool or nano fiber materials or ceramic fiber material.

14. The method of claim 1, wherein the sorbent material resists burning and melting when exposed to a temperature of about 700° F. or higher for one minute.

15. For an aquatic environment in which there is one or more types of oil, an in-situ burning device comprising:
    a fire-resistant sorbent material configured to wick the oil for a flame, wherein the sorbent material includes fibers of sufficient size to be respirable, and wherein the sorbent material resists burning and melting when exposed to a temperature of about 700° F. or higher for one minute; and
    an active aeration system configured to inject air into the sorbent material.

16. The device of claim 15, further comprising a fire-resistant ligature binding the sorbent material into a bale.

17. The device of claim 15, wherein the sorbent material is coupled to a frame, and wherein an elevation of the frame, relative to a surface of the water, is controllable to thereby adjust the combustion process of the oil.

18. The device of claim 17, further including a buoyancy system mounted to the frame, wherein a buoyancy of the buoyancy system is adjustable to thereby control the elevation of the frame.

19. The device of claim 15, wherein at least part of the sorbent material is coated with at least one of an oleophilic material, an oligophilic material or a hydrophobic material.

20. The device of claim 15, wherein the sorbent material is positioned on an aquatic surface on which floats the oil, wherein the oil is being burned and the sorbent material is in contact with the oil and acting as a wick as the oil is burned.

21. For an aquatic environment in which there is one or more types of oil, an in-situ burning aerated wick comprising:
    a fire-resistant sorbent material configured to wick the oil; and
    a pipe including a vented segment disposed in the material whereby air is suppliable through the at least one pipe and out of the vented segment to thereby aerate the material.

22. The wick of claim 21, further comprising an air pump or other fluid supply device operatively connected to the pipe.

23. For an water environment in which there is one or more types of oil, an in-situ burning device comprising:
    a fire-resistant wicking bale including:
       a fire-resistant sorbent batt configured to wick the oil; and a fire-resistant ligature binding the batt into a bale;
a frame to which the bale is mounted; and
at least one pipe, the at least one pipe including a vented segment having a plurality of vents therein, each vented segment being disposed in the batt whereby air can travel through the at least one pipe and exit the vents to thereby aerate the batt.

24. The device of claim 23, further comprising a source of pressurized air operatively connected to the at least one pipe.

25. The device of claim 24, further comprising a buoyancy system, mounted to the frame, configured to selectively raise or lower the batt relative to a surface of the water.

26. The device of claim 25, wherein the buoyancy system is configured to move the batt between a first position in which that the batt is positioned entirely above and out of contact with the surface of the water, and a second position in which the batt is in contact with the surface of the water.

27. The device of claim 25, wherein the oil is a layer floating on the surface of the water, and the buoyancy control system is configured to selectively submerge a part of the batt to a depth comparable to a thickness of the oil layer.

28. The device of claim 25, wherein the buoyancy control system is configured to selectively submerge a portion of the bale sufficient to extinguish combustion of oil being wicked by the batt.

29. The device of claim 15 wherein the sorbent material is made of at least one of stone wool or nano fibers or rockwool or mineral wool or slag wool or ceramic fibers.

\* \* \* \* \*

UNITED STATES PATENT AND TRADEMARK OFFICE
CERTIFICATE OF CORRECTION

PATENT NO. : 8,894,862 B2  
APPLICATION NO. : 13/760720  
DATED : November 25, 2014  
INVENTOR(S) : Michael A. Champ It is certified that error appears in the above-identified patent and that said Letters Patent is hereby corrected as shown below:

In the Claims

In Claim 7, Column 9, Line 38-39, it reads:

"least part of the sorbent material in contact with, the oil on the surface of the water or the oil/water emulsion."

It should read:

-- least part of the sorbent material in contact with the oil/water emulsion. --

Signed and Sealed this  
Second Day of June, 2015

Michelle K. Lee  
*Director of the United States Patent and Trademark Office*